Dec. 23, 1958 M. G. CROSBY 2,866,163

MODULATOR

Filed July 27, 1954

INVENTOR.
MURRAY G. CROSBY
BY
Lippincott & Smith,
ATTORNEYS

United States Patent Office 2,866,163

Patented Dec. 23, 1958

2,866,163

MODULATOR

Murray G. Crosby, Hicksville, N. Y.

Application July 27, 1954, Serial No. 446,019

9 Claims. (Cl. 332—38)

Figure 1:
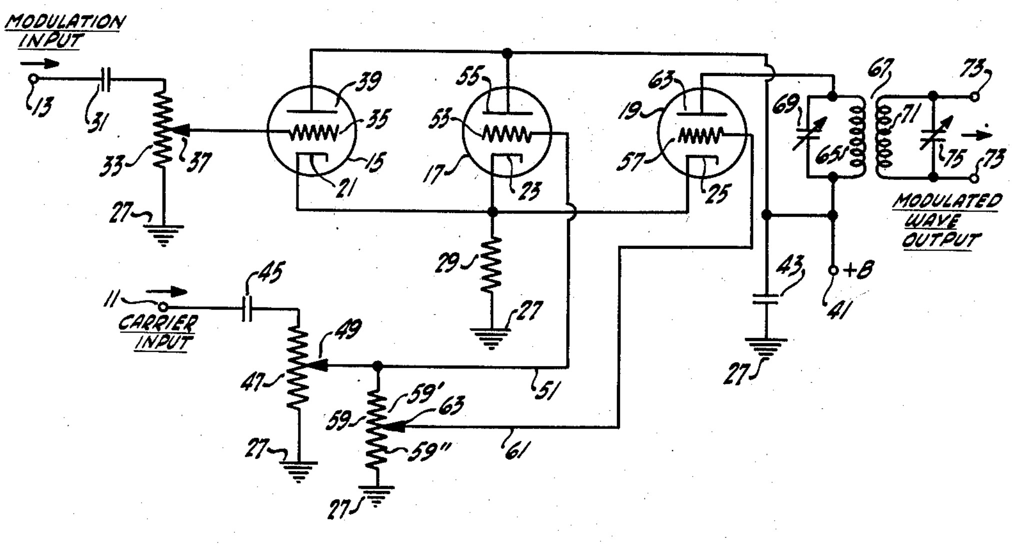

This invention relates to modulation apparatus and particularly to modulation apparatus of a sort usable in connection with diversity receivers. Receivers of this sort usually embody a plurality of installations all connected to receive incoming signal energy through connection to antennas which are either spaced apart geographically or which have other characteristics tending to make them generally different in response.

This application is a continuation-in-part of my copending application for Letters Patent in the United States, Serial Number 199,522, filed December 6, 1950, now U. S. Patent No. 2,720,583, issued October 11, 1955, and entitled "Diversity Receiving System."

The modulation device of the type herein to be described is in the nature of an amplitude modulator particularly useful in connection with the diversity combining system of the sort described in the parent application above-identified, although it is likewise a modulation device of a generally useful sort adapted to a wide variety of uses. As the modulator will be described it will be found to have characteristics of low inherent distortion and the ability to provide an amplitude modulated wave with an output which is directly proportional in amplitude to the amplitude of the applied carrier wave.

This is somewhat at variance with the usual conventional amplitude modulator where, in order to obtain low distortion, the conventional modulator of this sort, of which the so-called plate modulated triode is an example, requires a saturation of input amplitude. Such a conventional modulator will not produce an output amplitude proportional to the carrier input amplitude.

In its essence the modulator will herein to be described in its particular use as a balanced modulator in the generation of single sideband modulation. The carrier may be completely eliminated in the manner of a balanced modulator by proper adjustment of the carrier neutralization. The circuit of the sort herein to be described has the great advantage of simplicity in that balanced transformers are not required. Also because the system as a whole operates at high impedance levels, a higher over-all circuit transmission is obtained than is normally obtainable with the conventional balanced modulators.

The modulating device of the sort here to be described may be considered as comprising a plurality of thermionic devices all having their cathode elements connected in a fashion such that the cathodes are grounded through a resistance which may also be of relatively high value as compared, for instance, to the tube impedance. Modulation input signals may be applied as input signals to one of the tubes to produce a variance in the cathode potential which follows the modulation. Carrier frequency voltage input is applied to a second of the tubes (or to a second half of one of the tubes where multi-purpose tubes are used and more than one separate electron path is provided within the tube) so that the cathode potential of this tube varies with the carrier input and modulation applied to the previous tubes.

The last tube of the modulator has its cathode potential varied in accordance with the rise and fall of cathode potential of the previous two tubes relative to a fixed point (such as ground). There may be applied to an input electrode of the last of the three tubes, for instance, a voltage which represents a reduced amplitude of the carrier input or in the alternative, the last tube may operate with a grounded grid. In either instance the effect obtained is as if there were a phase reversal of the carrier applied to the last tube with respect to the second tube so that in an output circuit connected to this last tube there will be available the modulated wave output representative of the carrier frequency recovered as modified in amplitude by the modulator signals derived from the removal of the sideband modulation from the incoming signal. This is the modulated signal voltage which may then be applied to a detector of known character. The important factor is that the amplitude modulator shall provide an amplitude modulated wave having a percentage of modulation which is independent of the carrier amplitude and depends only upon the amplitude of the modulation source.

In accordance with the foregoing general description of the general characteristics of the invention it will be observed that an object of the invention is that of providing an amplitude modulator of a type which has a characteristic of low inherent distortion and which is efficient in its operation, is ideally suited to use in connection with the diversity receivers and which will function as an amplitude modulator which will produce an output amplitude proportional to the amplitude of the modulation source.

Figure 2:
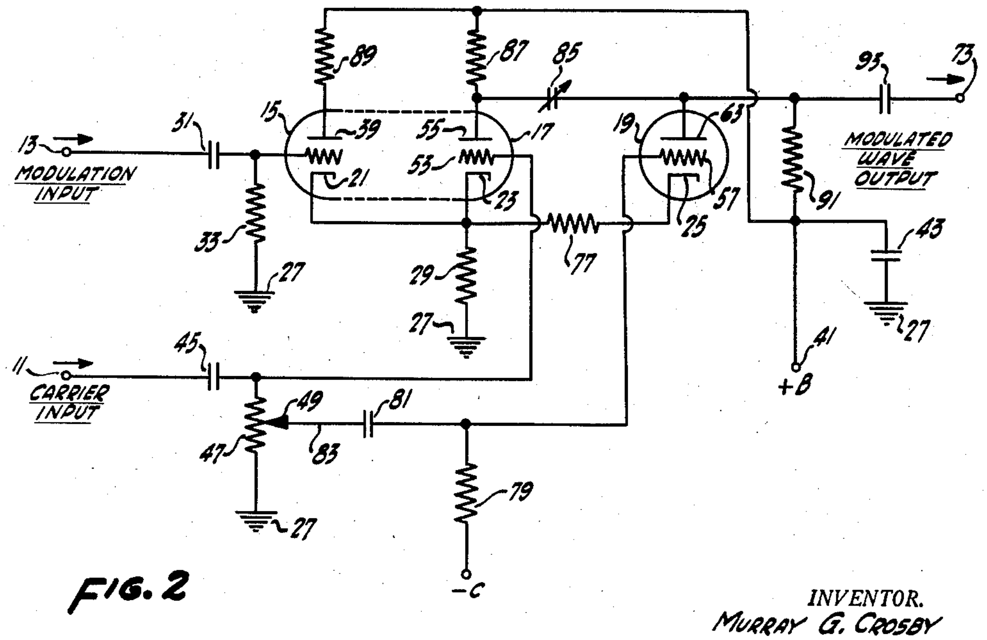

Other objects of the invention and further advantages thereof will become apparent from a consideration of the following description and claims in connection with the accompanying drawings wherein:

Fig. 1 is a circuit diagram of one form of modulator incorporating the features of the invention; and Fig. 2 is a circuit diagram of a modification of the circuit of Fig. 1.

Referring now for an understanding of the invention to the drawings and first to the circuit of Fig. 1, which is divided from application Serial No. 199,522, above mentioned, the carrier input is supplied as one of the controlling voltages at the input terminal 11. Similarly, the detected audio-frequency serving as the modulation input is supplied at the input terminal 13 to provide the second input to the control system.

Essentially, the modulator, as depicted by the circuit of Fig. 1, comprises three tubes, 15, 17 and 19, which each have their cathode electrodes 21, 23 and 25 tied together and connected to a point of fixed potential, such as ground 27, through a common cathode resistor 29. In this instance, the tubes 15, 17 and 19 are illustratively represented as triodes and shown as being contained within individual envelopes. It is, however, to be pointed out that this showing is purely illustrative in nature in that the tubes depicted may be triodes, tetrodes, pentodes, or other types. Likewise while a single envelope has been shown for each individual tube component it must be emphasized that this also is merely for convenience of illustration. As an example, the tubes 15 and 17, for instance, might be comprised within a single envelope in which case a tube of the so-called 12AU7 type may be regarded as suitable.

It is, accordingly, to be understood that multi-purpose tubes in which two or more components are contained within the same tube envelope may be utilized where desired and within the meaning of this description the reference to separate tubes shall be regarded as indicative of separately functioning electron paths within tubes rather than to the number of tube envelopes per se. Likewise, in connection with modulation devices it is frequently desirable, and particularly in cases where high power outputs are necessary, to operate several tubes in parallel so that the showing of single tubes is to be understood as being illustrative rather than limiting. In such instances, any or all of the tubes 15, 17 and 19 may be considered to represent a plurality of parallelly connected components of multi-purpose or multi-part tubes.

As the description of the circuits by which the invention in its practical form is explained and illustrated the operation will be considered as functioning according to a plan wherein at the output a modulated carrier frequency is derived but since modulation devices are essentially of reverse character it will be understood that the operation may effectively function in the reverse direction. Therefore reference herein to modulation or modulators will be understood to include demodulation or demodulators, as the case may be.

Referring now again to the drawings and to Fig. 1, the input modulation signals, as available at the input terminal 13, are applied by way of the blocking condenser 31 across a suitable potentiometer 33, having one terminal thereof connected to the ground point 27, so as to reach the grid or control electrode 35 (or for that matter any cold electrode) of the tube 15 as desired. The signal amplitude may be controlled by an adjustment of the tapping contactor 37 on the potentiometer 33, so that signal applied to the grid or control electrode 35 of the tube 15 may be varied in amplitude.

Current flowing through the tube 15 is proportional to the input signal supplied at the terminal 13 with the result that the potential of cathode 21 will rise and fall in accordance with the current flowing through the cathode resistor 29. The plate or anode element 39 of the tube 15 is supplied with positive operating potential from a source (not shown) connected to the terminal point 41 with the polarity relative to ground 27 being as indicated by the legend +B. The condenser 43 connected between the terminal point 41 and ground 27 operates as a normal plate by-pass condenser.

Concurrently with the application of modulation potentials upon the tube 15 the filtered carrier input which is available at the input terminal 11 is supplied through the blocking condenser 45 and the potentiometer 47 to the second tube 17 of the series. The potentiometer 47 has one terminal connected to ground 27, as indicated. The controlled amplitude of this carrier input potential which is available across the potentiometer resistance to be supplied by tube 15 is obtained at the tapping point 49 and is supplied through the conductor 51 to the control grid or other suitable cold electrode 53 of the tube 17. The tube 17 derives operating potential to be supplied at its anode or plate 55 by connection to the terminal point 41 in a manner similar to the connection of anode 39 to tube 15 to this terminal point.

A carrier signal input voltage is also supplied to the grid or control electrode 57 of the tube 19 by way of a suitable voltage divider 59. In this way the carrier voltage obtainable at the input of the tube 19 is a reduced amplitude relative to that supplied to the tube 17. The carrier voltage of reduced amplitude is then fed by way of the conductor 61 from the voltage divider 53 which conductor connects as shown to the grid or control electrode 57. The voltage divider 59 as represented is a potentiometer with the sections 59′ and 59″ thereof established by virtue of the point of connection of the slider or contactor 63 on the potentiometer 59.

It is apparent that with the slider or contactor 63 connected at the lowermost point on the potentiometer 59 which is indicated as being ground 27 the grid or control electrode 57 will also be at ground. For this condition the tube 19 will operate as a cathode driven, grounded grid amplifier, otherwise the tube 19 operates but with its grid or control electrode and its cathode both driven in the same phase.

Suitable plate operating voltage is supplied to the plate or anode 63 of the tube 19 from the already mentioned source connected to terminal point 41 by way of the primary winding 65 of the output transformer 67, which primary winding is suitably tuned by the indicated shunt connected capacity 69.

The output transformer 67 has its secondary winding 71 connected to two output terminal points 73 and may be suitably tuned, where desired, by the indicated adjustable capacitor 75. The described arrangement operates in such a way that the tubes 15 and 17 function as cathode followers and with increasing signal strength in the positive direction applied at the grid or control electrode 35 of the tube 15 the cathode element 21 thereof, and consequently the cathodes of all of the tubes 15, 17 and 19, tend to follow in the same direction. With the carrier input applied to the grid or control electrode 53 of the tube 17 the cathode also tends to swing positive on positive half cycles. Consequently, with the cathode 25 of the tube 19 following the operation of the other cathodes by virtue of the common connection, the tube 17 functions as a driver for the output tube 19 and serves to drive the cathode 25 of this tube. The grid element 57 of the tube 19 is connected to receive either a reduced amplitude carrier input from that available at the input terminal point 11, or the tube may operate as a grounded grid type of tube and, accordingly, it will be apparent that the operation is in opposite phase to that of the tube 17.

With the circuit so functioning part of the carrier output is neutralized by the voltage supplied by way of conductor 61 to the grid 57 of the tube 19 to improve the linearity of the amplitude modulation. This is because of the fact that the voltage divider provided by potentiometer 59 provides a carrier drive to the grid 57 which is out of phase with that supplied to grid 53. This is caused by the cathode drive arrangement in which tube 17 acts as a cathode follower driving the cathode of the tube 19. The result is that the carrier output is neutralized by the feed to the grid 57 of the tube 19. The general effect is to provide a partial carrier elimination. Likewise, the circuit functions in such a way that a reduced degree of modulation is raised to a higher percentage value.

From the described circuit it will now become evident that the connections are such that the output from the three tube combination is obtainable from the output transformer 67. Thus, at the output terminal 73 only the output from the output tube 19 is present even though the actual modulation as available at the input terminal 13 from the desired source, such, for example, as the exalted carrier or single sideband adaptor of the sort described in the parent application of which this application is a continuation-in-part, may be only of the order from 30 to 50 percent. The resultant modulation at the output of tube 19 may be raised to as high as 100%. This procedure is such that only a very low degree of distortion results in the over-all modulation system. The output signal from the modulation system herein described then may be derived as above indicated from the secondary winding 71 of the transformer 67 when appropriately tuned by a capacitor element such as that shown in Fig. 1 to be supplied to a suitable detector (not shown).

The broad principles of the invention described in connection with Fig. 1 are depicted by the showing of Fig. 2 to which reference is now made and wherein it will be observed that broadly the circuits are similar but the circuitry of Fig. 2 provides further operational refinement in that provision is made to improve the operation of the modulator and particularly its use as a balanced modulator in the generation of single sideband modulation. The modification is such that by making proper adjustment of the carrier neutralization the carrier may be completely eliminated in the general manner of a balanced modulator. Circuitry of the sort shown by Fig. 2 has advantages of simplicity in that it avoids the need for balanced transformers and the system operates at high impedance levels. This insures a higher over-all circuit transmission than would be obtainable with more conventional balanced modulators.

In the circuitry of Fig. 2 components functioning in a capacity similar to those shown by Fig. 1 carry like reference numerals insofar as conveniently possible. It will be observed in consideration of Fig. 2 that the tube 19 is provided with a self-biasing cathode resistor 77 which may or may not be by-passed in a generally conventional manner by a suitable by-pass condenser (not shown).

In the circuit of Fig. 2 when the self-biasing cathode resistor 77 is utilized it will be observed that the grid bias provided through the grid resistor 79 is zero so that it is then possible to remove the resistor 79 and its associated blocking condenser 81 and to connect conductor 83 to a suitable point on the potentiometer 47. For conditions where the self bias resistor 77 is not used bias on the grid bias control electrode 57 for the tube 19 may be applied through the resistor 79, as shown by Fig. 2.

In the operation of the circuit of the sort described by Fig. 2 it has been found that self bias by means of resistor 77 gives less over-all amplitude than fixed bias by means of resistor 79, but, despite this fact, the self bias form of operation is frequently to be preferred because of its simplicity.

Considering still further the showing of Fig. 2 it will be observed that the inter-electrode capacity may be neutralized by means of a suitable neutralizing condenser 85 connected between the plate or anode 55 of the tube portion 17 and the plate or anode 63 of the tube 19. In this connection a resistor element 87 is connected in the plate or anode circuit of the tube 17 to provide neutralizing voltage to the condenser 85 for the form of connection shown. The neutralization voltage derived from the resistor 87 is of such phase that it neutralizes the capacity feed-through from the cathode 25 to the plate or anode 63 of the tube 19. When the circuit is neutralized in accordance with the operation shown it is much easier to obtain complete carrier elimination at the higher carrier frequencies. The resistor 89 connected in the plate or anode circuit 39 of the tube 15 is generally of the same value as the resistor 87 which is used to balance the two tubes, which preferably have substantially identical operating characteristics. However, since the value of resistors 87 and 89 is relatively small it is possible, if desired, to eliminate the resistor 89 without materially affecting the operation.

By the operation as disclosed by Fig. 1 it will be observed that carrier neutralization has been supplied from the potentiometer 59 to the grid or control electrode to the tube 19 to an extent that improved double sideband amplitude modulation is obtainable. The neutralization may be carried to the extent that the carrier is completely eliminated to provide carrier eliminated double sidebands amplitude modulation, and the inclusion of the neutralizing circuit provided by the condenser 85 of Fig. 2 hereof improves the degree of carrier neutralization that may be obtained.

Without attempting to limit the operation but nonetheless to indicate suitable operating parameters it may be pointed out that the tubes 15 and 16 may be collectively in the form of a 12AU7 type. The so-called 6C4 type tube in a separate envelope for isolation purposes may be used as the tube 19.

Illustrative of the values for the resistors 87 and 89 it is possible to select resistors for this purpose having values of 560 ohms. The cathode resistor 29 under such circumstances may have a value of the order of 1000 ohms, while the self biasing cathode resistor 77 then could be considered as having a value of the order of 2700 ohms. The plate resistor 91 which connects to the plate or anode 63 of the tube 19 at one end and at its other end to the terminal point 41 whereat positive operating potential is applied and which potential is indicated by the designation +B may be of a value of 39,000 ohms. The potentiometer may be considered as one of 10,000 ohms. Capacity resistance couplings shown at 31, 33 and 81, 79 are designed to pass the modulation frequencies and the carrier frequencies respectively. The coupling condenser 93 supplying the modulated output wave to the terminal point 73 is designed to pass the modulated wave to subsequent circuits. The neutralizing condenser shown at 85 preferably may be of a value of between zero and 15 micromicrofarads.

From the foregoing it will be observed that the circuitry depicted by Fig. 2 offers an amplitude modulator in which extremely low distortion is present and yet a circuit in which there is a substantially linear relationship between the carrier input level and the modulated wave output level, with the percentage of modulation independent of the carrier level and wherein high impedance inputs with a relatively high gain are provided. Also, important improvements may be said to result from the fact that the circuit operates completely without transformer components.

Various modifications of the invention are, of course, usable and including among which naturally may be the various operating components and parameters used, depending upon the type of operation to which the circuit is to be put.

Having now described the invention what is claimed is:

1. An amplitude-modulator comprising three thermionic tubes each including a cathode and a plurality of cold electrodes, a common connection between all of the separate cathode elements to maintain said elements at like potential relative to a selected fixed point, a resistor element connected between the said cathode elements and the point of fixed potential, means for supplying modulation input signals to a cold electrode of the first of the plurality of three thermionic tubes, means for supplying a carrier input voltage to a cold electrode of the second of the three thermionic tubes, said first and second thermionic tubes having their anode elements parallelly connected to a common source of operating voltage, means independent of said second tube for supplying the carrier input voltage also to a cold electrode of the third thermionic tube to drive it in phase with carrier-frequency variations in potential of the cathode thereof, and an output circuit connected to a cold electrode of the third of said tubes to receive output signals representing modulation products of the signal voltages applied to the first and second tubes.

2. A modulating device comprising three thermionic tubes each having a cathode element and a plurality of cold electrodes, a common connection between all of the cathodes, resistive means connected between the cathodes and a point of fixed potential, means to supply modulation input voltages upon the input circuit of one of the tubes, means to supply carrier frequency input voltages upon the input circuit of the second of the three tubes, means for supplying the carrier frequency input voltage also to the input circuit of a third tube and at an amplitude less than that of the carrier applied to the input of the second tube so that the effect of phase reversal of voltage is obtained at the third tube with respect to that on the second tube through the cathode follower connection provided by the common cathode resistor and common cathode connection, and a load circuit connected to the third tube wherein voltages representing modulation products of the voltages applied to the input of the first and second tubes are available.

3. The modulation device claimed in claim 2 comprising, in addition, means to control the amplitude of each of the modulation input voltages to the first tube and the carrier input voltage to the second and third tubes whereby the modulation product voltages appearing in the output of the third tubes vary in amplitude in proportion to the carrier wave input and in percentage amplitude modulation in accordance with the modulation source input.

4. A modulator comprising three thermionic tubes each including cathode, grid and plate electrodes, means to interconnect the cathode elements of all tubes, a resistance connected between each cathode and a point of fixed potential, means for connecting a source of modulation input to the grid electrode of the first of the tubes, means for connecting a source of carrier input to the grid of the second of the tubes, a connection between the plate electrodes of each of the first two tubes and a source of potential which is positive with respect to the point of fixed potential, means independent of said second tube to supply a selected percentage of the carrier voltage applied to the grid of the second tube to the grid of the third tube, and a load circuit connected to the plate of the third tube only wherein voltages representing modulation products of the signals and voltages applied to the grid electrodes of the first and second tubes are developed.

5. A frequency changing device comprising a pair of thermionic tubes each having a cathode, an anode, and a control electrode, a load resistor connecting from the cathodes of both of said tubes to a point of reference potential, means for supplying a modulating-frequency potential to the control electrode of a first one of said tubes, means for supplying a carrier-frequency potential to the control electrode of a second one of said tubes, an output tube also having a cathode, an anode and a control electrode, the cathode of said output tube being connected to be driven by voltages developed across said load resistor, a load circuit connecting to the anode of said output tube, and means for establishing the instantaneous potential of the control electrode of said output tube at a value independent of voltages developed in the cathode-anode circuits of either of said pair of tubes, said last-mentioned means including connections for applying to the control electrode of said output tube a carrier-frequency potential that is in phase with and of smaller amplitude than that applied to the control electrode of the second tube of said pair.

6. A frequency changing device comprising a pair of thermionic tubes each having a cathode, an anode, and a control electrode, a load resistor connecting from the cathodes of both of said tubes to a point of reference potential, means for supplying a modulating-frequency potential to the control electrode of a first one of said tubes, means for supplying a carrier-frequency potential to the control electrode of a second one of said tubes, an output tube also having a cathode, an anode and a control electrode, the cathode of said output tube being connected to be driven by voltages developed across said load resistor, a load circuit connecting to the anode of said output tube, and means for establishing the instantaneous potential of the control electrode of said output tube at a value independent of voltages developed in the cathode-anode circuits of either of said pair of tubes, said last-mentioned means including a potentiometer having one terminal connected to said point of reference potential and a second terminal connected to said carrier-frequency supplying means, and a connection from the control electrode of said output tube to a variable tapping point on said potentiometer, whereby any desired degree of neutralization of carrier-frequency component can be achieved in said load circuit.

7. A frequency changing device as in claim 5, additionally comprising a resistance element connected between the cathode of said output tube and the cathodes of said pair of tubes to provide a self-bias on the output tube.

8. A frequency changing device as in claim 5, additionally comprising a load resistance connected to the plate of each tube of said pair, and a capacitor connecting the anode of said output tube to the anode of said second tube, thereby supplying a neutralization voltage to neutralize the capacitive coupling from the cathode to the plate of the output tube.

9. A frequency changing device as in claim 5, additionally comprising means to neutralize the capacitive coupling from the cathode to the plate of the output tube.

References Cited in the file of this patent

UNITED STATES PATENTS

| | | |
|---|---|---|
| 2,248,083 | Hofer | July 8, 1941 |
| 2,485,665 | Shephard | Oct. 25, 1949 |
| 2,535,340 | Yost | Dec. 26, 1950 |
| 2,537,843 | Meacham | Jan. 9, 1951 |